United States Patent

Collin

[11] 4,033,562
[45] July 5, 1977

[54] FURNACE FOR MELTING SOLID FERROUS PIECES

[75] Inventor: Per Harald Collin, Falun, Sweden

[73] Assignee: ASEA Aktiebolag, Vasteras, Sweden

[22] Filed: June 13, 1974

[21] Appl. No.: 479,078

[30] Foreign Application Priority Data

June 18, 1973 Sweden ............................ 7308499

[52] U.S. Cl. .................................. 266/216; 13/26; 75/11; 266/197; 266/234; 266/900; 266/901
[51] Int. Cl.² .......................................... C21C 7/00
[58] Field of Search .................... 75/10, 11, 12, 13; 266/24, 25, 33 R, 33 S, 34 A, 197, 216, 217, 234, 900, 901; 13/26

[56] References Cited

UNITED STATES PATENTS

| 1,880,012 | 9/1932  | Brassert .................... | 266/25   |
| 1,948,696 | 2/1934  | Brassert et al. .......... | 266/25 X |
| 2,139,853 | 12/1938 | Rohn ........................ | 75/11    |
| 2,363,582 | 11/1944 | Gerber et al. ............ | 13/26 X  |
| 2,382,534 | 8/1945  | Baily ......................... | 75/12    |
| 3,236,628 | 2/1966  | Bogdandy .................. | 75/11    |
| 3,671,029 | 6/1972  | Karlsson et al. ......... | 266/34 A |
| 3,752,663 | 8/1973  | Worner et al. ........... | 75/11    |
| 3,827,877 | 8/1974  | Pantke et al. ............ | 75/12    |

FOREIGN PATENTS OR APPLICATIONS

| 595,636 | 12/1947 | United Kingdom ............... | 13/26 X |

OTHER PUBLICATIONS

*The Cupola J its Operation*, The American Foundrymen's Society, Third Edition 1965, pp. 8–9.

Primary Examiner—Roy Lake
Assistant Examiner—Paul A. Bell
Attorney, Agent, or Firm—Kenyon & Kenyon Reilly, Carr & Chapin

[57] ABSTRACT

A furnace for melting solid ferrous pieces such as pig iron and steel scrap, features a combination of electric induction heating and flame heating of the pieces which are charged into the furnace hearth via a charging stack up through which the products of combustion flow from the furnace counter-current to the descending charged pieces moving downwardly through the stack. The flame heating is via burners supplied with hydrocarbon fluid fuel with oxygen proportioned for incomplete combustion, the products of combustion and unburned fuel ascending through the stack and preheating the descending charged pieces. Air is supplied to the stack to complete the combustion of the previously unburned fuel in and around the descending pieces, this being done at a level where the descending pieces have not yet reached temperatures sufficient to cause excessive oxidation of the pieces. Other details providing for effective utilization of these principles, are included in the disclosure.

3 Claims, 2 Drawing Figures

FURNACE FOR MELTING SOLID FERROUS PIECES

BACKGROUND OF THE INVENTION

Pig iron and scrap steel have heretofore been melted in cupola furnaces, and electric arc furnaces and electric induction crucible furnaces.

A cupola furnace has the disadvantage that it requires a solid expensive metallurgical coke having a particle size larger than 40 mm and a low ash content. It is like a small blast furnace and requires equipment for powering and heating its blast.

An arc furnace involves high electrical energy and electrode supply costs and also may involve a high noise level when starting a melting operation.

In the case of an electric induction crucible furnace, there is the problem of the high electric energy expense.

The foregoing shows that there is a need for an improvement on the furnaces now available for the melting of pig iron and scrap.

SUMMARY OF THE INVENTION

According to the present invention, such an improvement is provided by a furnace comprising an enclosure having a roof, a hearth for containing a melt of the ferrous pieces, the enclosure forming a free space under the roof above this melt, and an upstanding charging stack for the pieces, which extends through the roof and has an open bottom end spaced above the level of the melt. With this arrangement, the ferrous pieces descend through the charging stack and form a column of the pieces between the stack's bottom end and the top level of the melt in the hearth.

The hearth is made with a substantially flat bottom and a flat induction coil, possibly two coils, are positioned below this bottom with a coil configuration inductively forming interspaced ridges with a valley therebetween in the top level of the melt, the stack's bottom end being positioned above this valley so that the column of ferrous pieces is formed above this valley, the column being supported by the hearth.

In addition, burners extend through the roof, which are supplied with hydrocarbon fluid fuel and air for incomplete combustion, the burners being positioned to direct flames against the bottom of the column of pieces. Thus, the pieces are heated by both the induction heating and the flame heating.

The products of combustion and unburned fuel exit from the furnace via its charging stack down through which the charged ferrous pieces descend, these pieces being thus preheated prior to leaving the bottom end of the stack. In addition, air is introduced to the stack to complete the combustion of the unburned fuel rising in the stack, this being done at a position high enough in the stack to assure that the pieces have not yet reached a temperature causing an excessive oxidation of the pieces or, in other words, an iron fire.

The furnace cover is provided with chutes through which solid carbonaceous particles, such as coke, coal dust or anthracite may be charged to the melt on the outsides of the previously mentioned ridges, for deoxidation of the melt, the ridges representing inductively stirred molten metal.

The charging of the ferrous particles may be continuous, the melt being continuously tapped from the furnace hearth.

BRIEF DESCRIPTION OF THE DRAWINGS

The presently preferred mode for carrying out the invention is illustrated schematically by the accompanying drawings, in which.

DETAILED DESCRIPTION OF THE INVENTION

Figure 2:
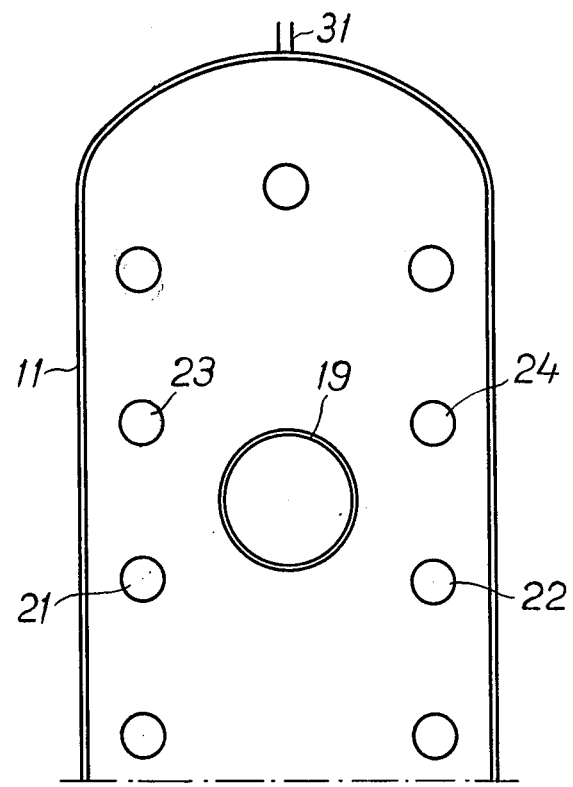
FIG. 2 is a plan view.

Having reference to the accompanying drawings, the furnace enclosure 11 is shown as being horizontally elongated with straight sides and round ends, the ratio between length and width varying up to 10:1, FIG. 2 showing this ratio as being about 4:1. The bottom portion of the enclosure defines the hearth for containing the melt, and below this bottom the electric induction coil 12 is positioned, this coil being substantially flat as is the hearth bottom 13 of the furnace. The coil 12 is flat and has its convolutions free from the central portion of the furnace bottom 13. More than one coil may be used providing the arrangement has the same configuration. Magnetic yokes 14 prevent outward leakage of the magnetic flux so that this flux is largely confined to the melt, these yokes also functioning as supports of the coil or coils 12.

The furnace bottom 13 is rammed or bricked in the usual manner (not shown) to form the substantially flat hearth for the melt, this hearth extending up the bottom portion 11a of the side wall of enclosure 11 but there being no need to provide an induction coil or coils for this portion.

When alternating current is supplied to the coil 12, usually single-phase and low frequency (50–60 Hz), the stirring forces indicated by the arrows 15 cause the formation of the ridge 16 surrounding the valley 17 in the top level of the melt. The induction coils both contribute to the melting of the charge and stir the melt, while because of the contour of the coil 12, the ridge 16 is formed.

The charge of pig iron or steel scrap 18 is fed through the upstanding vertical stack 19 positioned centrally through the roof 20 of the furnace enclosure, this stack increasing in diameter downwardly to prevent possible jamming of the charged ferrous pieces. The furnace enclosure forms a free space under the roof above the melt in the hearth 12 and the open bottom end of the stack is spaced above the top level of the melt in the furnace hearth.

The furnace roof 20 may be an arch or a suspended roof, and it may be swingable and/or raisable. In any event, it is in this roof 20 that two or more fluid carbonaceous fuel burners 21 through 24 are installed on opposite sides of the stack 19, these burners being directed straight or obliquely against the furnace bottom; preferably, there are directed in the direction of the space between the bottom end of the stack 19 and the furnace bottom 13. These burners may be supplied with heating oil, bottled gas, methane or other hydrocarbon fluid fuel, the burners mixing air with the fuel for combustion. The mixture is adjusted with such a low oxygen potential that the solid ferrous pieces 18 and the melt, heated by the flames from the burners and the induction heating coil, is not unduly oxidized. The pieces 18 form a column beneath the bottom end of the stack 19 which separates and rests on the furnace bottom or hearth 13, and the flame from the burners 21 to 24 are preferably directed towards this spreading portion of the column.

The products of combustion and the unburned fuel, due to its incomplete combustion, penetrate this spreading portion of the column and go upwards as indicated by the arrows 25 counter-current to this descending charge 18, rising through the top of the level of the charge in the upper portion of the stack 19 as shown by the arrows 26, the gases exiting as indicated by 27, while the charge is continuously induced as indicated by the arrow 28. Thus, the charge 18 is preheated while descending through the stack 19.

As the charge 18 descends in the stack 19, it is gradually heated by the ascending gases which are essentially reducing gases because of their content of the unburned fuel. Before leaving at 27, the unburned fuel is burned by the injection of air into the stack 19 via two or more tuyers 29 and 30 which open into the stack. These tuyers are positioned at a level of the stack where the charge of ferrous pieces has been preheated insufficiently for them to be excessively oxidized or burned by the oxygen of the injected air. In other words, the level referred to is that where the charge 18 has not become so hot by the preheating as to result in an iron fire due to this injection of oxygen in the form of air. This completion of the combustion of the unburned fuel component of the rising gases, further preheats the charge 18.

Figure 1:
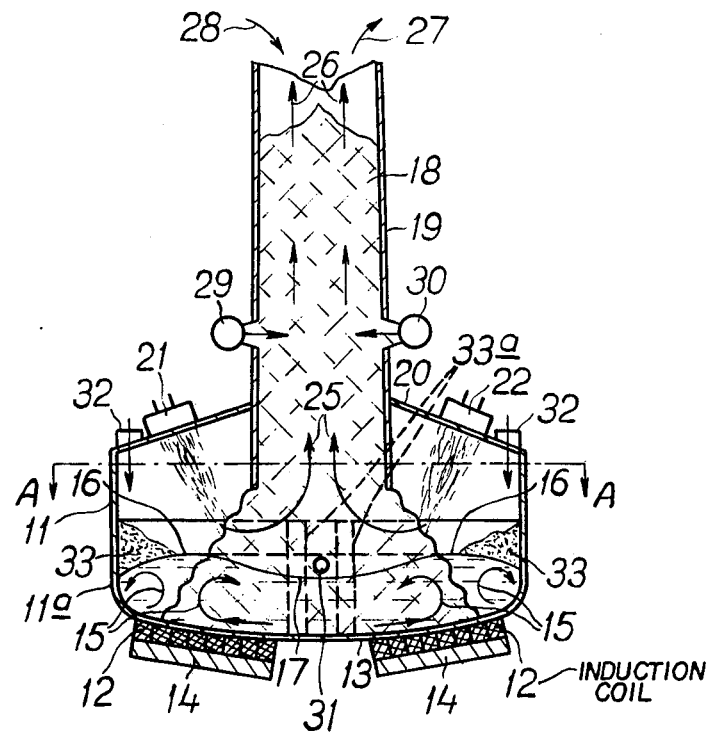
FIG. 1 is a vertical section through the new furnace.

The combined heating effects of the induction heating and the open flame heating melts the charge and forms the molten bath, gradual melting of the spreading column of the charge beneath the opened bottom of the stack 19 causing gradual feeding of the charge. The induced currents form the two ridges 16 shown in Fig. 1 which at the ends of the bottom or hearth 13 are interjoined by approximately semicircular ridges, the result being one continuous ridge. Because of the elongated shape of the furnace enclosure 11, indicated by Fig. 2, additional fluid fuel burners as indicated by the additional circles in FIG. 2, may be used to provide flame heating throughout the extent of the furnace hearth or bottom 13 so that the combined effects of flame heating and induction heating prevail throughout the entire furnace. This continuous ridge of the melt is surrounded on its outside by a peripheral valley and the furnace roof 20 is provided with a plurality of chutes 32, shown by FIG. 1, which are positioned above this peripheral valley. Through these chutes coke or other carbonaceous material, such as coal dust or anthracite, is charged as required to maintain the carbonaceoues material on the outside of the peripheral ridge, as indicated at 33 in FIG. 1.

For the continuous withdrawal of the melt from the hearth, as required because of continuous charging of the furnace with the ferrous pieces, a tapping hole 31 is provided at one end of the furnace enclosure, dams 33a holding back the carbonaceous material 33 so that only the melt is tapped. It is possible, of course, to charge the furnace intermittently and to tap intermittently if continuous operation is not desired.

In operation, the induction coils 12 produce the previously described ridge or ridges spaced on either side or around the bottom end of the stack 19, which, incidentally, might also be called a charging chute. The melt is, of course, inductively heated and at the same time the flames provided by the burners 21 to 24, and possibly more, provide open flame heating of the ferrous material. These burners provide insufficient oxygen, via suitable proportioning of the air and fluid fuel, to assure that the gases produced are reducing in character. This avoids oxidation of the melt within the furnace enclosure and of the incoming or descending charge which throughout the lower portion of the stack 19, may have a temperature sufficiently high for iron to burn. Prior to reaching such a temperature, the oxygen, usually in the form of air, is injected into the stack 19 via the tuyers 29 and 30, the unburned fuel then burning to add further heat to the portion of the charge 18 above these tuyers.

The carbonaceous material 33, in conjunction with the inductive stirring, insures against the melt having an undesirable oxygen content. This material 33 may include refining agents if desired. The carborizing agent for the melt may be provided in other ways than suggested here.

What is claimed is:

1. A furnace for melting solid pieces of metal and comprising a horizontally elongated furnace enclosure having a length-to-width ratio of at least about 4:1, said enclosure having a bottom portion forming a hearth and a roof spaced above the hearth, a vertical stack down through which the pieces of metal are charged and positioned centrally through said roof and having a bottom positioned so the charged pieces form a column down to a melt in said hearth, electric induction means below said hearth for inductively stirring the melt to form interspaced ridges in the melt's top level and a valley between the ridges with the valley below the stack spout's said bottom, burner means for directing carbonaceous fuel and oxygen flames of low oxygen potential towards said hearth and melt and forming reducing gases leaving said furnace enclosure upwardly via said stack containing the metal pieces above said column, and injection means for injecting oxygen into said stack to cause complete combustion of said gases, the pieces in the stack gradually increasingly preheating downwardly in the stack to temperatures where they are combustible in the presence of oxygen, said injection means being positioned high enough in the stack to be above the level where the pieces have preheated to said temperatures.

2. The furnace of claim 1 in which said burner means directs said flames at downward angles in the direction of said column.

3. The furnace of claim 2 having means for introducing carbonaceous material to the sides of said ridges away from said valley.

* * * * *

UNITED STATES PATENT AND TRADEMARK OFFICE
CERTIFICATE OF CORRECTION

PATENT NO. : 4033562
DATED : July 5, 1977
INVENTOR(S) : Per Harald Collin

It is certified that error appears in the above-identified patent and that said Letters Patent are hereby corrected as shown below:

Column 4, line 41, delete "stack spout's" and replace with --stack's--.

Signed and Sealed this

Fourth Day of October 1977

[SEAL]

Attest:

RUTH C. MASON
Attesting Officer

LUTRELLE F. PARKER
Acting Commissioner of Patents and Trademarks